May 24, 1960

J. MACHLIS 2,937,811

DIGITAL RATIOMETER

Filed April 12, 1956

Jerome Machlis
INVENTOR

BY

ATTORNEY

May 24, 1960

J. MACHLIS 2,937,811

DIGITAL RATIOMETER

Filed April 12, 1956

Jerome Machlis
INVENTOR

ATTORNEY

United States Patent Office 2,937,811
Patented May 24, 1960

2,937,811

DIGITAL RATIOMETER

Jerome Machlis, Granada Hills, Calif., assignor, by mesne assignments, to Hymac Corporation, Los Angeles, Calif., a corporation of California Filed Apr. 12, 1956, Ser. No. 577,766

4 Claims. (Cl. 235—179)

This invention relates generally to digital meters and more particularly to a digital ratiometer.

The ratio of two voltages is frequently as desirable to know as it is to determine the respective voltages. In the measurement, for example, of a potentiometer pickoff or wiper voltage with respect to the entire potentiometer voltage across the whole resistive element, the ratio of the two voltages can give a simple, direct reading of the relative position of the pickoff element. This is clearly true without calibration with a linear potentiometer. This information is useful, for example, when the pickoff element is responsive to the displacement of an object within certain given limits which correspond to the entire potentiometer voltage and it is desired to telemeter information of the proportionate displacement of the object between those limits to a remote point. The ratio of the resulting signal to supply voltages provides a reading which is independent of the absolute value of the reference voltage or the total resistance of the potentiometer.

It is an object of this invention to provide means for automatically determining the ratio between two voltages.

Another object of this invention is to provide means for presenting voltage ratios in numerical, digital indications.

Another object of the invention is to provide a ratiometer capable of measuring a plurality of voltage ratios for different potentiometers on the same instrument.

A further object of this invention is to provide an accurately indicating ratiometer including means for "backup" voltages and a floating power supply.

Briefly, the foregoing and other objects are preferably accomplished by providing a bridge circuit having an external load potentiometer as one branch of the bridge and a servo potentiometer as the other branch. A voltage supply is connected between the ends of the bridge across both branches and a comparator circuit is connected between the centers of the branches formed at the pickoff wipers of the potentiometers. The comparator output is fed to an amplifier which drives a servomotor. The servomotor is mechanically coupled to operate a decimal digital counter and also to adjust the pickoff wiper of the servo potentiometer whereby the bridge is balanced according to the signal appearing on the pickoff wiper of the load potentiometer and a numerical ratio reading is indicated on the counter.

The invention possesses other objects and features, some of which together with the foregoing will be set forth in the following description of a preferred embodiment of the invention, and the invention will be more fully understood by reference to the attached drawings, in which.

Figure 1:
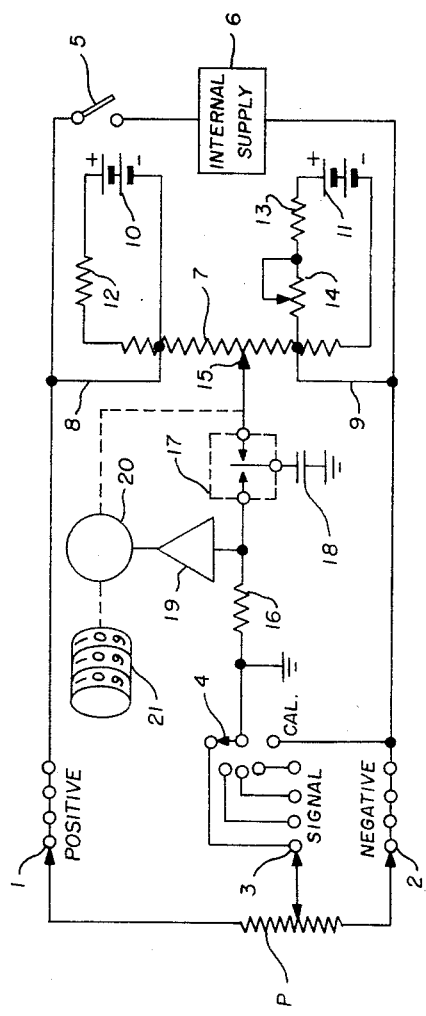
Figure 1 is a simplified schematic of the voltage ratio circuit.

Referring first to Figure 1, there is shown a simplified circuit of the invention. Four sets of input terminals are provided, each set consisting of three terminals. The three terminals of a set include one of the positive terminals 1, one of the negative terminals 2 and one of the signal terminals 3. All four positive terminals 1 are connected internally together and all four negative terminals 2 are similarly tied together internally. The signal terminals 3, however, are connected to a five position selector switch 4. Each signal terminal 3 is separately connected to a switch position contact, the last remaining switch position contact being connected to the negative terminals 2 for calibration purposes. A zero reading should be obtained for this switch position. The pole of switch 4 can be positioned to any of the five switch position contacts.

Four different load potentiometers can be respectively connected to the four input channels of the invention. A potentiometer P, for example, can be connected between the positive and negative input terminals of a set and the potentiometer pickoff wiper is connected to the signal terminal of the set. The position of the pickoff wiper on the potentiometer thus determines the input signal to the device. A power supply switch 5 is closed to provide a five volt supply 6, for example, across the load potentiometer when there is no external supply. However, when the load potentiometers are already supplied externally, the switch 5 is left open since the internal supply would not then be necessary.

It is clear from examination of Figure 1 that the bridge supply is floating since neither the positive nor negative terminals are connected directly to chassis ground within the instrument, and it is possible to ground the signal input connection at the switch selector arm, for example, as shown in Figure 1, thus preventing any tendency of the servo to be affected by bridge supply voltage fluctuations. In operation, the instrument must be isolated from external circuits.

The load potentiometer P connected to the input terminals forms one branch of a bridge circuit. The other branch of the bridge is formed by a servo potentiometer 7. Servo potentiometer 7 is tapped near both ends and connected respectively to the positive terminals 1 and negative terminals 2 by leads 8 and 9. The internal supply 6 is connected across the ends of the bridge by switch 5. When an external supply is used, the external supply is effectively across the load potentiometer connected between terminals 1 and 2 and also appears between leads 8 and 9 to provide a supply across both parallel branches of the bridge.

The ends of servo potentiometer 7 are connected with batteries 10 and 11 in closed loops as shown. Limiting resistor 12 is connected in the positive end loop, and limiting resistors 13 and 14 (which are adjustable) are provided in the negative end loop of servo potentiometer 7. These batteries 10 and 11 produce opposing polarity voltages on the ends of servo potentiometer 7 to provide "backup" voltages for the servo in case of overshoot of pickoff wiper 15.

A comparator circuit is connected between the centers of the bridge at the pickoff wipers of the load potentiometer and the servo potentiometer. In Figure 1, this is effectively between the selector arm of switch 4 and pickoff wiper 15. The comparator circuit includes a resistor 16, a single pole, two position chopper 17 which can be energized to vibrate between the two position contacts at a reference frequency as, for example, at a line frequency of 60 c.p.s. A capacitor 18 connects the chopper pole to ground.

The input signal to amplifier 19 is a 60 c.p.s. error signal which results from any difference existing between input load voltage and the comparison servo voltage as determined by the comparing action of chopper 17. The error output of the comparator circuit is amplified and used to energize the control winding of servomotor 20. Servomotor 20 is mechanically connected to drive a three stage decimal counter 21 and to position the pickoff wiper 15 of the servo potentiometer 7 eliminating the error signal by balancing the bridge. A digital reading is provided by the counter 21 when the bridge is balanced.

Figure 2A:
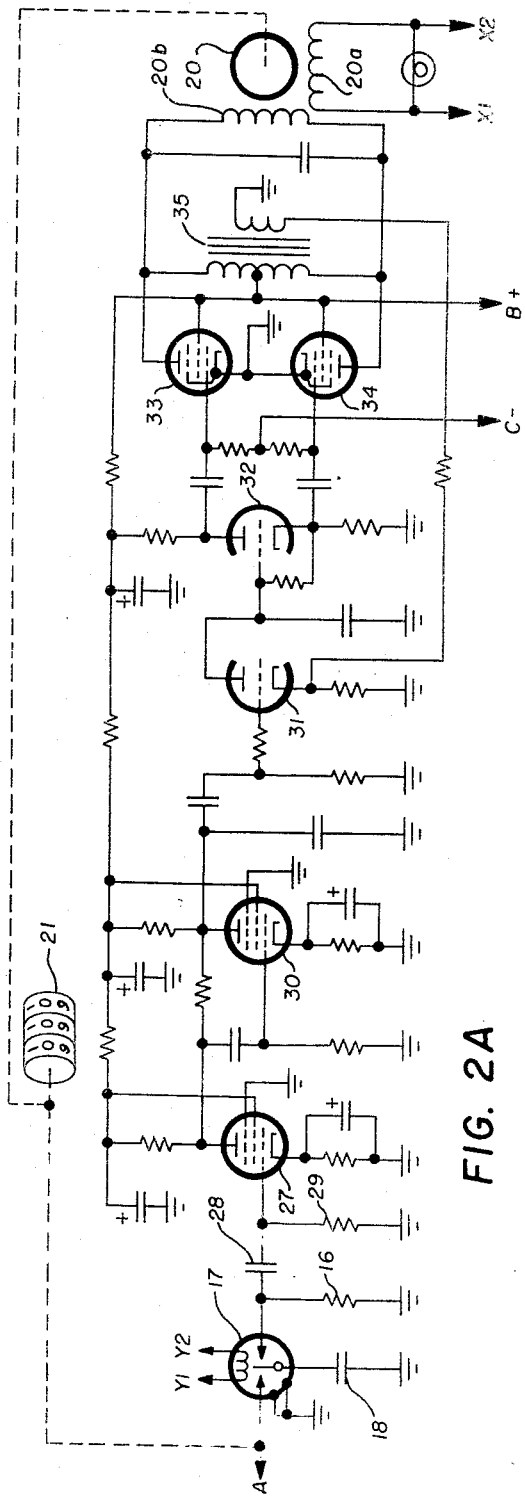
Figure 2A is a detailed wiring diagram showing a preferred embodiment of the comparator, amplifier, servomotor and digital indicator portions of the invention.
Figure 2B:
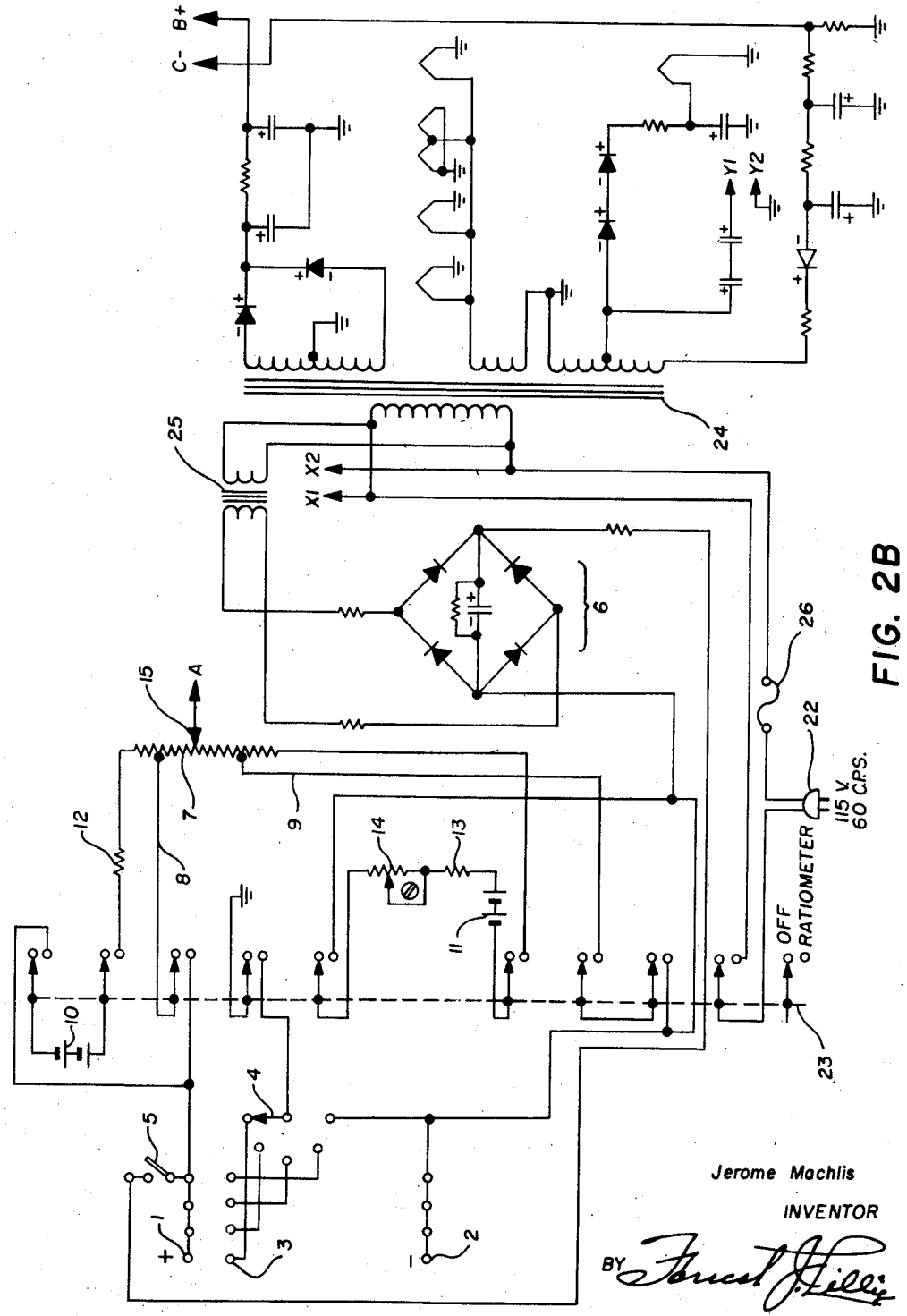
Figure 2B is a detailed wiring diagram which is a continuation of Figure 2A and illustrates the channel selector and power supply sections of the invention.

The digital ratiometer is shown in full detail by Figures 2A and 2B. The complete circuit is obtained by connecting correspondingly labeled leads together between the two figures. Figure 2A illustrates the chopper 17, amplifier 19, servomotor 20 and counter 21. Figure 2B shows the power supply section for the instrument including internal supply 6, backup voltage sources 10 and 11, a channel selector switch 4, servo potentiometer 7 and an on-off control switch 23.

Referring jointly to Figures 2A and 2B, power is provided at plug 22 and is controlled by a multiple pole on-off switch 23. When the switch 23 is turned on, 115 volt, 60 c.p.s. power is applied to two transformers 24 and 25, and to a winding 20a of servomotor 20. A fuse 26 is provided in the line to the transformers for overload protection.

The transformer 24, through suitable secondaries and rectifiers, provide the necessary plate and bias supply voltages B+ and C— for amplifier 19, as well as chopper 17 excitation voltage on lines Y1 and Y2. Transformer 25 supplies a full wave rectifier 6 which comprises the internal supply source for the instrument.

The batteries 10 and 11 are also connected in their respective loops when switch 23 is turned on and provide backup voltages as previously described in Figure 1. The remainder of the circuit including the input terminals 1, 2 and 3 for connecting up to four load potentiometers, selector switch 4 and the servo potentiometer 7 are the same as shown in Figure 1.

The pickoff wiper 15 of servo potentiometer 7 is connected to one contact of chopper 17, the other contact being connected to the control grid of tube 27 through coupling capacitor 28. Grid return resistor 29 connects the control grid to ground as shown. The values of resistors 16 and 29, and of capacitor 28 are selected to provide critical damping of the servo loop through derivative control and replacement of any of these components with one of different value would result in under or over damping of the system.

The primary function of chopper 17 is to detect the difference between the input voltage appearing between the pole of switch 4 and negative terminal 2 and the position feedback voltage appearing between the pickoff wiper 15 and negative terminal 2. The chopper 17 alternately connects the ungrounded side of capacitor 18 to pickoff wiper 15 and to the amplifier input. There is no direct connection between the servo potentiometer 7 and the amplifier, and the chopper sampling action thus reduces potentiometer noise to the amplifier. When capacitor 18 is momentarily connected to the servo potentiometer 7, it is quickly charged to the potential of the servo potentiometer pickoff wiper. On the next half cycle, capacitor 18 is connected to the amplifier input where its charge is compared with the signal voltage from a load potentiometer on switch pole 4. The difference voltage or error signal is amplified to operate the servomotor 20 while servo loop stability is maintained by using selected component values in the amplifier input circuit.

Tubes 30 and 31 are connected in two more amplifier stages and tube 32 is connected to provide a phase inverter which drives push-pull output tubes 33 and 34. The power output from 33 and 34 is impedance coupled to the control winding 20b of servomotor 20 by means of transformer 35. This method of coupling prevents chattering and cogging since the choke action of transformer 35 confines most of the alternating current signal to the motor control winding and keeps direct current out.

Servomotor 20 drives the three stage decimal counter 21 and the pickoff wiper 15 in a direction to balance the bridge such that a digital reading is provided by counter 21 when the bridge is balanced.

From the above description it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A digital ratiometer, comprising: a positive and a negative input terminal to which a load potentiometer can be connected, and a signal input terminal to which a position variable pickoff wiper on the load potentiometer can be connected; a servo potentiometer connected between said positive and negative input terminals and having an adjustable pickoff wiper; a source of direct voltage adapted to be connected between said positive and negative input terminals; a comparator circuit connected between said signal input terminal and the pickoff wiper of said servo potentiometer and having an output according to the voltage difference existing between said signal input terminal and the pickoff wiper of said servo potentiometer, said comparator circuit including a single pole chopper having two position contacts, and a storage capacitor connected to said pole for storing a charge, said signal input terminal and the pickoff wiper of said servo potentiometer being respectively adapted to be connected to the position contacts of said chopper; means responsive to the output of said comparator circuit for adjusting the position of the pickoff wiper of said servo potentiometer to reduce the voltage difference; and digital indicating means connected to said latter adjusting means for indicating the position of the position variable pickoff wiper of said load potentiometer, said indicating means being calibrated to indicate the ratio of a voltage existing between the position variable pickoff wiper of said load potentiometer and an end of the load potentiometer, to the voltage across said load potentiometer.

2. The invention according to claim 1 wherein said signal input terminal is directly connected to chassis ground thereby preventing any tendency of said servo circuit to be affected by voltage fluctuations of said source of direct voltage.

3. The invention according to claim 1 including, in addition, means for providing backup voltages across the end portions of said servo potentiometer whereby overshoot of the pickoff wiper of said servo potentiometer can be reversed.

4. The invention according to claim 1 including, in addition, a single pole, multiple position switch having a plurality of contacts for connecting respectively with position variable pickoff wipers of a plurality of load potentiometers which can be connected in parallel between said positive and negative input terminals, the pole of said switch being connected to said signal input terminal, whereby a multiple channel digital ratiometer is provided.

(References on following page)

References Cited in the file of this patent

UNITED STATES PATENTS

| | | |
|---|---|---|
| 1,862,595 | Holden | June 14, 1932 |
| 2,246,686 | Jones | June 24, 1941 |
| 2,402,210 | Ryder et al. | June 18, 1946 |
| 2,486,357 | Gilbert | Oct. 25, 1949 |
| 2,781,482 | Montgomery | Feb. 12, 1957 |
| 2,819,437 | White | Jan. 7, 1958 |

OTHER REFERENCES

Servo Mechanism Practice (Ahrendt), 1954, pages 2, 3 and 99.